Feb. 25, 1936.  H. W. BODENDIECK  2,031,921
GROUNDING SET
Filed July 18, 1931  3 Sheets-Sheet 3
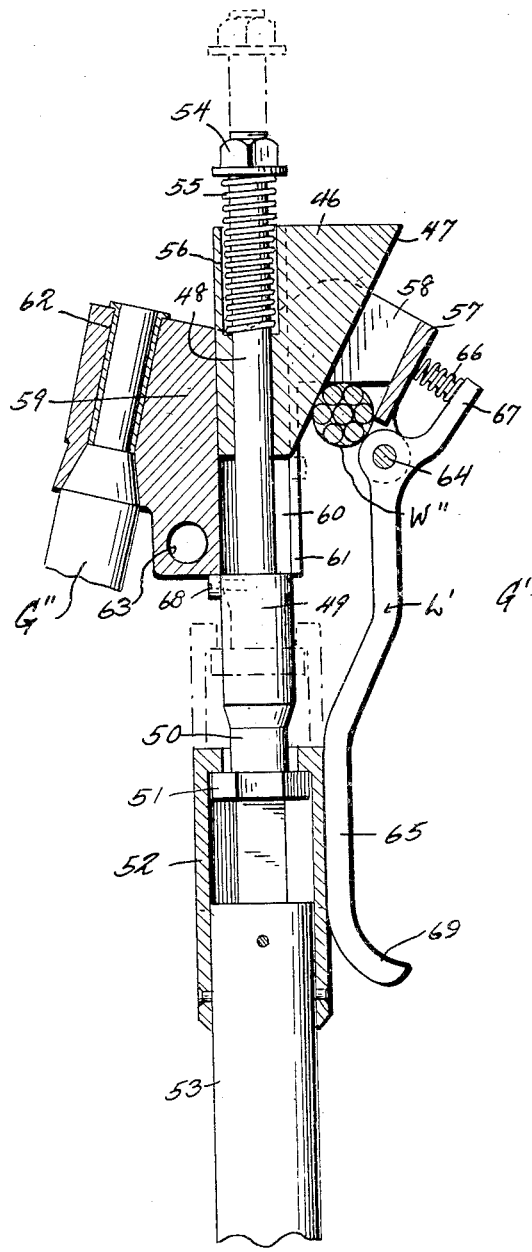
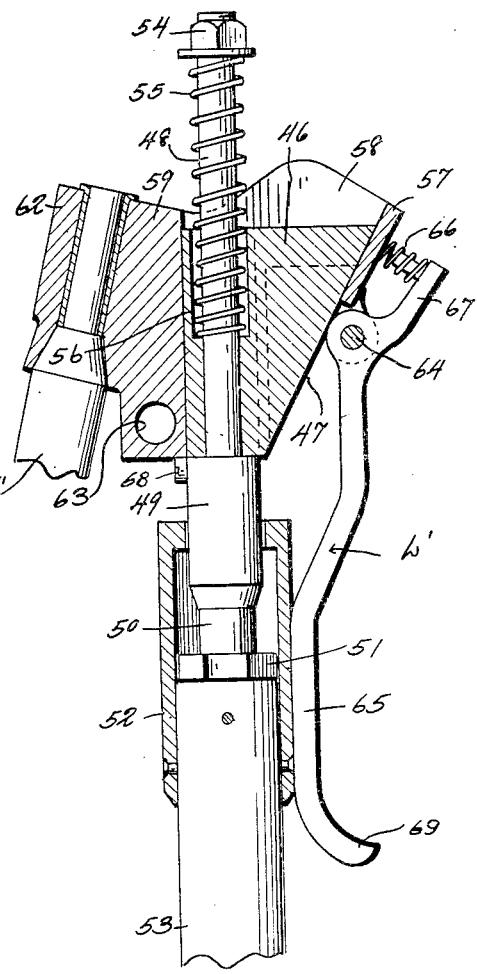

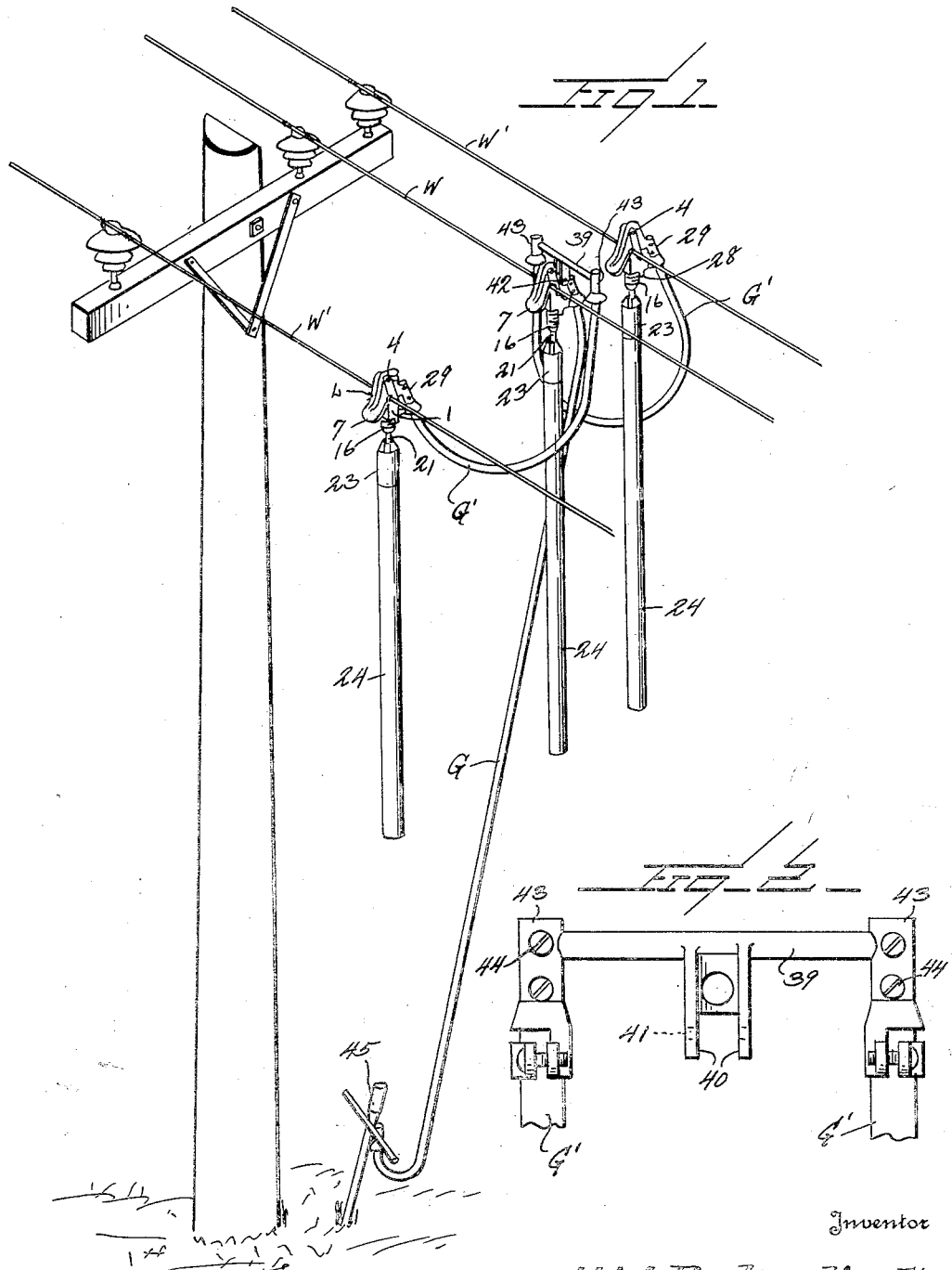

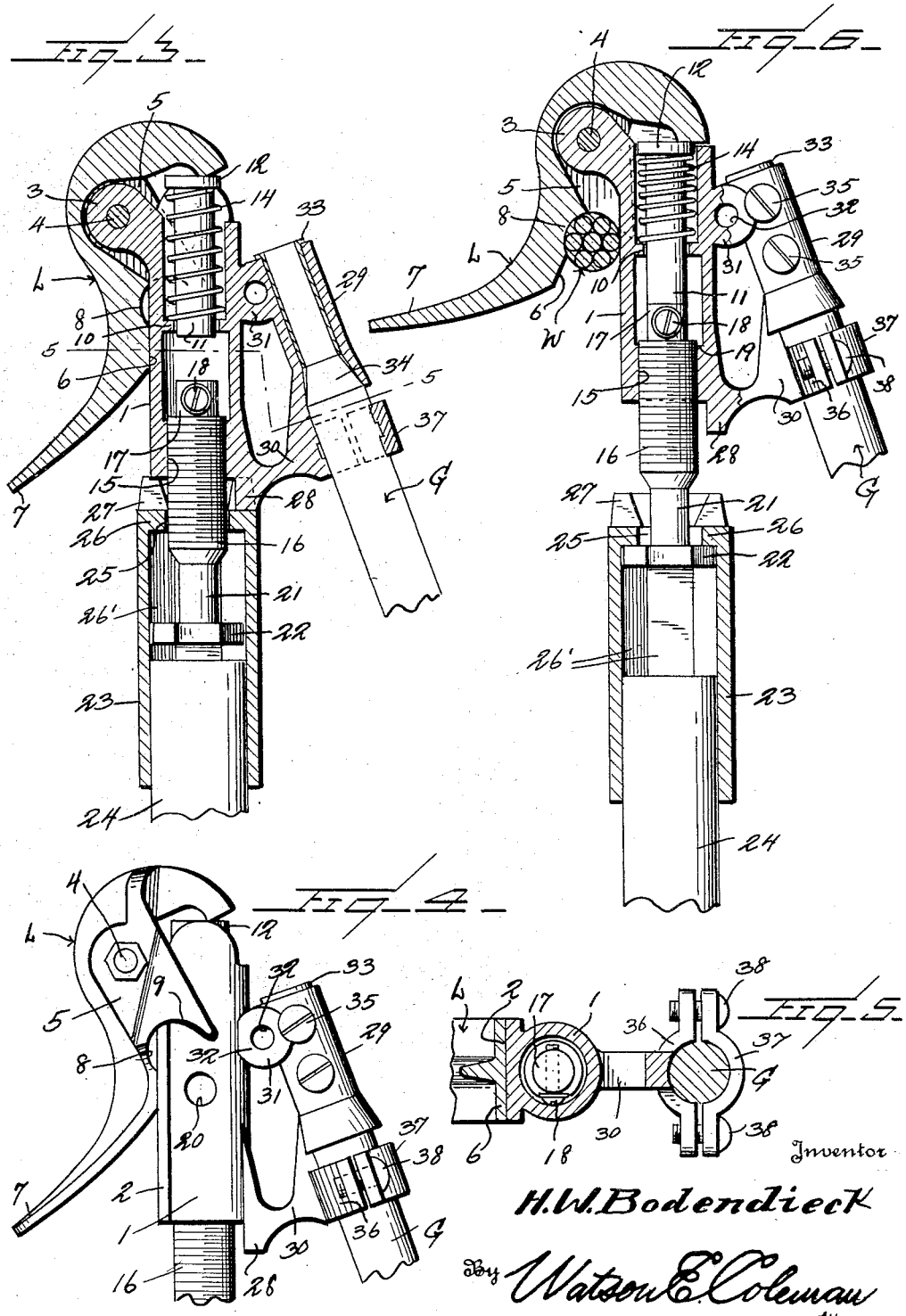

Patented Feb. 25, 1936

2,031,921

UNITED STATES PATENT OFFICE 2,031,921

GROUNDING SET

Henry W. Bodendieck, Taylorville, Ill., assignor to Tips Tool Company, Inc., Taylorville, Ill., a corporation of Illinois Application July 18, 1931, Serial No. 551,812

26 Claims. (Cl. 173—273)

This invention relates to grounding sets and has relation more particularly to a set of this kind especially designed and adapted for use in connection with hot or high power lines although, of course, it is not intended that the set be limited to this particular use.

The invention has for an object to provide a set of this kind which may be effectively employed in connection with all of the wires of the system, as for example the well known three wire system now generally in use, the set being so constructed and assembled as to require only a single conductor to be grounded in the application of the set.

A still further object of the invention is to provide in connection with a set of this kind a line wire clamp comprising normally closed jaws between which is adapted to be readily received a line wire, together with means for positively effecting a tight engagement of the clamp with such wire after being initially received between the jaws.

An additional object of the invention is to provide a set of this kind including a wire engaging clamp which may be readily and effectively applied to a wire line by an operator at a point below the line or out of the electrical field surrounding the wire, thus substantially eliminating liability of injury to the operator.

The invention contemplates as an object to provide a set of this kind with a clamp constructed and operating in a manner whereby the same can be readily manipulated by an operator from a point away from a line to effect a tight engagement of the clamp with the line and in a manner to prevent overheating, arcing and the like.

A still further object of the invention is to provide a set of this kind including a clamp adapted for engagement with a line wire, said clamp having associated therewith means whereby the clamp may be properly manipulated by an operator upon the ground or other location remote from the line and wherein means are provided in the application of the clamp before it grips the line to ground the circuit for a sufficient period of time to assure the opening of the automatic switch or switches comprised in a relay at a booster station or other point along the system.

A further object of the invention is to provide in a set of this kind a line wire engaging member to which a lead line or wire is adapted to be connected, said connection being such to minimize the liability of breakage of such connection.

The invention consists in the details of construction and in the combination and arrangement of the several parts of my improved grounding set whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a grounding set constructed in accordance with an embodiment of my invention in applied position with respect to a three wire system;

Figure 2 is a view in e evation of the gang or bus-bar as herein disclosed unapplied with several of the associated conductors in fragment;

Figure 3 is a view partly in section and partly in elevation of one of the clamping members as comprised in my improved set;

Figure 4 is a fragmentary view in elevation of the clamp as illustrated in Figure 3 with the operating stick or member omitted;

Figure 5 is a sectional view taken substantially on the line 5—5 of Figure 3;

Figure 6 is a view similar to Figure 3 with certain of the parts in different positions;

Figure 7 is a view partly in section and partly in elevation illustrating a clamp constructed in accordance with a further embodiment of my invention;

Figure 8 is a view similar to Figure 7 showing certain of the parts in different positions.

As herein disclosed, my improved grounding set is assembled for use with a three wire system and comprises a plurality of clamping members of substantially the same construction and which, in the assembly of the set, are so connected one with the other as to require but a single line leading to the ground from one of the sets, thus materially facilitating the application of the set.

In the embodiment of the invention as particularly illustrated in Figures 1 to 6 inclusive, each of the clamping members comprises an elongated tubular shank or body 1 having its outer end open and provided substantially from end to end with an external flat and relatively broad face 2. The outer end portion of the member 1 is provided with a laterally disposed lug 3 through which is directed a pivot bolt or member 4 also directed through the inwardly disposed side plates 5 at the outer end portion of a sigmoidal lever L.

The outer portion of this lever L, or that part beyond the pivot bolt or member 4, is disposed on a curvature to have its free end terminating in overlying relation at all times with respect to the bore of the member 1. The swinging movement of said outer portion of the lever L away from the member 1 being limited by contact of the intermediate or jaw portion 6 of the lever L with the member 1.

The inner end portion of the lever L is disposed outwardly from this intermediate portion 6 and constitutes an elongated tongue or guide 7 which operates effectively to facilitate the application of the clamp upon a line wire.

The inner portion of the jaw 6 is provided with a recess 8 to facilitate the engagement of a line wire W between the jaw 6 and the member 1 and more particularly the flat face 2 of said member 1. This flat face 2 constitutes what may be termed a "stationary jaw".

The inner and lower portion of each of the side plates 5 of the lever L is also recessed, as at 9, said recess 9 being substantially in continuity with the recess 8. These recesses 9 provide effective means to limit the movement of the clamp during its application to a wire W, thus assuring the proper positioning of the wire W with respect to the jaws 6 and 2. It is also to be noted that each of the plates 5 is of such dimensions as to have a portion thereof terminating inwardly of the flat face 2 of the member 1 irrespective of the position of the jaw 6 with respect to the face or jaw 2.

The member 1 at a desired distance inwardly of its outer open end is provided with an inwardly directed annular flange 10 which serves as a guide for an elongated plunger 11. The outer end of this plunger 11 is provided with an enlargement or head 12 with which the adjacent outer end of the lever L directly contacts. This plunger 11 is constantly urged outwardly by an expansible member 14, herein disclosed as a coil spring of desired tension, encircling the plunger 11 and interposed between the flange 10 and the head 12. The tension of this member or spring 14 is such to normally maintain the jaws 6 and 2 in close contact, yet readily permitting inward movement of the plunger 11 to allow outward swinging movement of the jaw 6 so that the clamp may have effective engagement with the line wire W, as particularly illustrated in Figure 6.

The inner portion of the bore of the member 1 is reduced and in threaded engagement with this reduced portion 15 of the bore is an elongated threaded member 16. The portion of the member 16 within the member 1 is continued by a reduced extension 17 and extending laterally from said reduced extension 17 is a member 18. This member 18 is adapted to have contact with the shoulder 19 resulting from the reduced portion 15 of the bore of the member 1 whereby complete removal of the elongated member 16 from the member 1 is provided. The member 1 at a desired point therealong is provided with an opening 20 to allow the application or removal of the member 18 which, as herein disclosed, constitutes a headed screw.

Upon requisite rotation of the member 16 the same will move inwardly of the member 1 bringing the extension 17 into contact with the inner end of the plunger 11, and continued inward travel of the member 16 will, therefore, result in a positive forcing of the jaw 6 toward the jaw or face 2 thus assuring a tight and effective engagement with the wire W. This operation of the member 16, however, is not effected until after the initial application of the clamp upon the wire.

The outer end of the member 16 is continued by a reduced extension or neck 21, and the outer portion of this extension or neck 21 carries a hexagon head 22. The head 22 at all times is within a socket member 23 mounted upon and secured to an end portion of an elongated operating handle 24. The outer portion of the member 16 and its extension or neck 21 freely enters the socket member 23 through a central opening 25 in the outer end wall 26 of the socket member 23.

The head or enlargement 22 is of a diameter in excess of the diameter of the opening 25 so that complete separation of the member 16 from the socket member 23 is prevented. The diameter of the opening 25, however, is materially greater than the diameter of the neck or reduced extension 21 of the member 16 and the head or enlargement 22 is of a diameter less than the internal diameter of the socket member 23. By this arrangement the handle member or stick 24 and the elongated member 16 may have lateral swinging movement one with respect to the other thereby facilitating the application of the clamping device to the line.

The internal wall 26' of the socket member 23 is angular in cross section so that at all times the elongated member 16 and the socket member 23 are held against independent rotation thereby readily allowing the desired turning of the elongated member 16 to adjust the same lengthwise in either direction as may be desired at all times and especially when the socket member 23 and the tubular member 1 are in locking engagement.

During the initial application of the clamping device to a line wire, it is important that the body member or shank 1 be held against rotation independently of the handle member 24 so that the tongue or guide 7 may be maintained in a desired position with respect to the line wire to assure the initial reception of said wire between the jaws 6 and 2 as the device is forcibly drawn into contact with the line wire as a result of the required pull upon the handle member or stick 24.

As particularly illustrated in Figures 3 and 6 of the drawings, the outer end of the socket member 23 at diametrically opposed points is provided with the recesses 27 into which is adapted to be selectively received a lug 28 extending beyond the inner end of the tubular member 1.

Normally the tubular member 1 and the parts carried thereby will rest by gravity upon the outer end of the socket member 23 with the lug 28 within one of the recesses 27. In this assembly the device in its entirety may be readily and conveniently manipulated by an operator through the instrumentality of the handle member or stick 24 at a point remote from a line wire and more especially out of the electric field surrounding such wire.

The handle member 24 in the present embodiment of my invention is telescopically received within the socket member 23 and this socket member as well as the tubular member 1 and the parts carried thereby are of materials readily conductive of electricity. In initially engaging a clamping device with a line wire W, the socket member 23 or the flat face or jaw 2 of the tubular member 1 is placed in contact with the wire whereby a ground is effected through a lead line G electrically connected to the tubular member 1 in a manner to be hereinafter described.

As the operator pulls down upon the handle member or stick 24 the line wire will be received between the inner portion of the tongue or guide 7 and the face or jaw 2 until the socket member 23 has had its limit of independent movement outwardly of the member 26.

During this period of time the contact of the line wire W with the jaw 2 or guide 7 will be sufficient, as a result of this initial grounding of the current, to effect the opening of the automatic switches as generally comprised in the relays, booster stations or the like interposed in the wire system. Continued pull upon the handle member or stick 24 causes the line wire to pass up between the jaws 6 and 2 and more particularly with the wire setting within the notch or recess 8. The resultant increased tension of the spring 14 as a consequence of the inward movement of the plunger 11 will serve to maintain the line wire W clamped between the jaws 6 and 2. This clamping action, however, is insufficient for safety and for an effective grounding. Therefore, with the handle member or stick 24 at the limit of its independent movement outwardly of the member 16 the handle member is turned in a proper direction to thread the member 16 inwardly of the tubular member 1. This movement of the member 16 inwardly of the member 1 will result in contact with the plunger 11 and outward movement of the plunger 11 to effect a tight and effective clamping of the line wire W between the jaws 6 and 2.

When it is desired to release the clamp from a line wire, it is only necessary to move the member 16 outwardly from the tubular member 1 a distance sufficient to allow the desired outward or separating movement of the jaw 6 as the body member 1 is forced away from the line wire W by proper stress upon the handle member or stick 24.

Carried by the body member 1, preferably at a point diametrically opposed to the lug 3, is a connector sleeve 29 disposed in a direction lengthwise of the member 1 and inclined inwardly toward the outer or open end of said member. The opposite end portions of the sleeve 29 are directly connected to the member 1 by the interposed webs 30 and 31. The outer web 31 is relatively narrow with its side faces flat and is provided therethrough with a central opening 32 for a purpose to be hereinafter set forth.

The sleeve 29 is adapted to receive the bared extremity 33 of the lead or ground line G, the major portion of which line being covered by suitable insulation 34. The extremity or end portion 33 of the line G is effectively held within the sleeve 29 by the holding or clamping screw 35 threaded through a wall of the sleeve 29 and having requisite contact with the bared extremity or end portion 33 of the line G.

To further facilitate the maintenance of the line G, which may also be termed a bypass wire, in desired connection with the sleeve 29, and more particularly to eliminate the breaking of such connection by undue bending of the line, the web 30 at a point spaced from the inner end of the sleeve 29 carries a fixed clamping jaw or plate 36 which has contact with the insulation 34 of the line G at a point spaced inwardly from the bared extremity or end portion 33. Coacting with this fixed plate or jaw 36 is a removable clamping plate or jaw 37, the line G being engaged between said plates or jaws 36 and 37 and clampingly held thereby upon proper tightening of the screw members 38 or the like connecting the end portions of the plates or jaws 36 and 37. The plates or jaws 36 and 37 provide a secondary holding means for the wire G and is particularly effective as it holds said wire G from accidental displacement with respect to the sleeve 29 as the weight of the wire G is carried by the secondary holding means thereby relieving the strain on the binding screws 35.

As particularly illustrated in Figure 1 my improved grounding set is adapted to be employed in connection with a three wire system and the clamping member provided with the lead or ground line G is preferably engaged with the central or neutral line wire W. However, before a clamping device is engaged with this line wire W there is secured to the clamping device an elongated cross or bus-bar 39, the central portion of which being provided with a pair of longitudinally spaced arms 40 which are adapted to snugly straddle from above the outer web 31 of the tubular member 1. These arms 40 are provided with openings 41 adapted to register with the opening 32 of the web 30 and an anchoring bolt or kindred member 42 is inserted through said registering openings whereby the cross or bus-bar 39 is securely maintained in applied position upon the tubular member 1 of a clamping device and in electrical connection therewith. The extremities of the bar 39 carry the connector sleeves or contacts 43 preferably having their axes, as illustrated in Figure 2, substantially at right angles to the axis of the bar 39. Each of these sleeves 43 is adapted to receive and have held therein by the clamping screws 44 the bared extremity of a lead line G'. The opposite end portion of this lead line G' is adapted to have a bared extremity in operative connection with the sleeve 29 of a second clamping device.

The broad or general idea of the elongated cross or bus-bar 39 is comprised in my pending application Serial No. 244,761 filed January 5, 1928 and to this extent the present application is partly in continuation of this other.

As all three of the clamping devices as illustrated in Figure 1 are identical it is believed that the detailed disclosure hereinbefore set forth of a clamping device is sufficient.

In practice, a clamping device is preferably first engaged with the central or neutral wire W of the wire system whereupon additional clamping devices are engaged with the remaining wires W' while the lead or ground line G is suitably grounded, as at 45. With the set thus applied the desired grounding of all three wires will be effected through the lead lines G' to the bar 39 and from the bar 39 to the ground through the single lead or ground wire G. It is, therefore, believed to be obvious that the grounding set as herein disclosed is one which may be applied in desired position with facility and safety and which can be also readily transported with convenience.

In the event the wire system should be of a number other than three wires, it is believed to be obvious that the clamping devices used will be of a number equal to the wires and that the connector sleeves carried by the bar 39 will be of the number required to permit the application of the clamping devices of the grounding set to all of the wires.

In Figures 7 and 8 is disclosed an embodiment of my invention comprising a body member 46, herein disclosed as substantially in the form of an inverted triangle, with its inclined face constituting a wedging clamping jaw 47. This member 46 is freely mounted upon an elongated shank 48, herein disclosed as constituting a reduced extension of a cylindrical and relatively long member 49. The outer end portion of the member 49 is continued by a reduced portion or neck 50 terminating in a hexagon head 51, said member 49 and head 51 coacting with a socket member 52 carried by a handle member or stick 53.

The coaction between the member 49 and the head 51 and the socket member 52 is similar to that hereinbefore explained in detail in connection with the socket member 23 and the member 16 with its head 22.

The outer end portion of the elongated member 48 has engaged thereon a nut 54 or other suitable member forming an abutment for an expansible spring 55 herein disclosed as encircling the member 48 and interposed between the nut 54 or the like and the inner end of the enlarged portion 56 of the bore of the member 47 through which the elongated member 48 is directed. This spring 55 serves to constantly urge the member 46 inwardly of the elongated member 48 or to urge the wedging jaw 47 toward the fixed jaw or plate 57 interposed between and supported by the side arms 58 arranged at opposite sides of the member 46 and carried by the outer end portions of a block 59. The block 59 along one marginal portion is provided with a bore 60 which snugly receives a marginal portion of the member 46, the wall of the bore being open, as at 61, from end to end to allow the desired projection of the wedging jaw 47. The block 59 is also provided with a sleeve 62 in which is engaged an end portion of a lead wire G'' and with an opening 63 to allow proper placement upon the block 59 of a cross or bus-bar similar to the bar 39 hereinbefore referred to.

The lower portion of the plate 57 has pivotally connected therewith, as at 64, an end portion of an elongated lever L', the outer portion of said lever having an elongated straight portion 65 normally in contact with the socket member 52.

This normal contact of the portion 65 of the lever L' with the socket member 52 is maintained, in this embodiment of my invention, by an expansible member or coil spring 66 interposed between the plate or jaw 57 and a tail piece 67 extending from the pivoted end portion of the lever L'. The outer extremity of the member 49 is provided with an outwardly disposed and laterally extending part 68 which, when in one position, such as illustrated in Figures 7 and 8, limits the movement of the block 59 toward the socket member 52 but upon turning the member 49 to bring this part 68 into alignment with the open portion or slot 61 said part 68 will be readily received within said open portion or slot whereby the member 49 and the block 59 together with the parts carried thereby will have unitary rotation whereby the initial application of the clamp to a line wire W'' will be materially facilitated. To further facilitate the application of the device to a line wire, the free end portion of the lever L', or that part in advance of the straight portion 65, is outwardly disposed as at 69, to provide a guide member or tongue.

Normally the wedging jaw 47 is in contact with the plate or jaw 57 and the straight portion 65 of the lever L' is normally in contact with the socket member 52 as illustrated in Figure 7. As the clamping device is initially engaged with a line wire, said wire will pass between the straight portion 65 of the lever L' and the socket member 52 and the length of the straight portion 65 is sufficient to assure such contact for a period of time to effect the automatic operation of the cut-out switches interposed in the wire system.

The engagement of the clamping device with the line wire is done by a pull being imposed upon the handle member or stick 53 and after the line wire W'' passes between the straight portion 65 and the socket member 52 the wire comes into contact with the wedging jaw 47 with a resultant outward movement of the member 46 against the spring 55 so that the line wire W'' will assume substantially the position illustrated in Figure 8. The resultant tension of the spring 55 will serve to force the member 46 inwardly whereby the wire W'' will be effectively held or clamped between the wedging jaw 47 and the plate or jaw 57.

From the foregoing description it is thought to be obvious that a grounding set constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A line engaging device comprising a tubular member, a plunger working within said member, means for constantly urging said plunger in one direction, a clamping jaw coacting with the member, means for movably supporting said jaw upon the member, said plunger also normally maintaining said movable jaw in contact with the member, and manually operated means engaging the plunger for forcing the movable jaw toward the member and maintaining the jaw against separating movement.

2. A line wire engaging device comprising an elongated member, a lead line in electrical connection therewith, a side face of said member constituting a jaw, a movable jaw carried by the member and coacting with said jaw face, means in said device for yieldingly holding the movable jaw and the jaw face in contact, and means carried by the elongated member and operable at a point remote from the movable jaw for forcibly moving the movable jaw toward the jaw face and to hold said movable jaw against movement away from the jaw face.

3. A wire engaging device comprising a tubular member, a line wire in electrical connection therewith, a plunger working within the tubular member, a lever pivotally connected with the tubular member, an end portion of the lever being normally in contact with the plunger, said lever having a jaw for coaction with the tubular member, yielding means for automatically moving the plunger in one direction to normally maintain the jaw of the lever at its limit of movement toward the tubular member, and means coacting with said yielding means for forcibly clamping a line wire between the jaw of the lever and the tubular member, and for holding said jaw against movement away from the tubular member.

4. A wire engaging device comprising a tubular member, a grounding wire in electrical connection therewith, a plunger working within the tubular member, a lever pivotally connected to the tubular member and having an end portion normally in contact with the plunger, said lever having a jaw for coaction with the tubular member, yielding means coacting with the plunger for moving the same in a direction to normally maintain the jaw of the lever at the limit of its movement toward the tubular member, a member in threaded engagement with the tubular member and extending within the bore thereof for contact with the plunger to forcibly move the plunger into clamping engagement with a line interposed between the jaw of the lever and the tubular member and to hold the jaw of the lever against movement away from the tubular member.

5. A wire engaging device comprising a member having a jaw face, a movable lever carried by said member and having a jaw for coaction with the jaw face of the member, yielding means for constantly urging the movable jaw toward the jaw face, and means for positively and forcibly moving the jaw into clamping engagement with a line interposed between said jaw and jaw face, said movable jaw having plates overlying the member at opposite sides of the jaw face, said plates serving to limit the positioning of a line between the movable jaw and jaw face.

6. A wire engaging member comprising a block, a grounding line in electrical connection therewith, a wedging jaw slidably connected with the block, a jaw plate carried by the block for coaction with the wedging jaw, means operable at will for positively moving the wedging jaw toward the jaw plate, and means operating automatically and independently of the first means for constantly urging the wedging jaw toward the jaw plate to clamp a line wire therebetween.

7. A line wire engaging device comprising an operating stick, a socket member carried thereby, a member coacting with said socket member and continued by an elongated rod, a wedging jaw slidably mounted on said rod, a block with which the wedging jaw is also slidably engaged, a grounding wire in electrical connection with the block, a jaw plate carried by the block and with which the wedging jaw coacts, means for urging the wedging jaw toward the jaw plate, an elongated lever pivotally carried by the block, and means for normally maintaining a portion of said lever in contact with the socket member, all of such parts with the exception of the handle being conductive of electricity.

8. A device of the class described comprising two relatively movable members between which an electric wire is adapted to pass, means for resiliently maintaining one of said members at the limit of its movement toward the other, an insulating handle providing a support for the device, and coacting means carried by the device and the supporting handle to provide additional means for positively urging one of the members toward the other.

9. A device of the class described comprising two relatively movable members between which an electric wire is adapted to pass, means for resiliently maintaining one of said members at the limit of its movement toward the other, an insulating handle providing a support for the device, means for connecting the handle to the device, said means allowing the handle to have movement independently of the device, and coacting means carried by the device and the supporting handle to provide additional means for positively urging one of the members toward the other upon movement of the handle independently of the device.

10. A device of the class described comprising two relatively movable members between which an electric wire is adapted to pass, means for resiliently maintaining one of said members at the limit of its movement toward the other, an insulating handle providing a support for the device, means for connecting the handle to the device allowing the handle to have rotary movement, and coacting means carried by the device and the supporting handle to provide additional means for positively urging one of the members toward the other upon rotation of the handle.

11. A device of the class described comprising two relatively movable members between which an electric wire is adapted to pass, means for resiliently maintaining one of said members at the limit of its movement toward the other, an insulating handle providing a support for the device, means for connecting the handle to the device allowing the handle to have endwise movement independently of the device, coacting means carried by the handle and one of the members to interlock said member and handle for unitary rotary movement upon movement of the handle toward such member, and coacting means carried by the device and the supporting handle to provide additional means for positively moving one of the members toward the other upon endwise movement of the handle in the opposite direction.

12. A grounding set comprising an assembled unit including a plurality of electric line engaging members, a grounding line leading from one of said members, a bus-bar carried by said member, means carried by the bus-bar for attaching the bus-bar to said member, and a conductor leading from each of the remaining members and in electrical connection with the bus-bar.

13. A grounding set as defined by claim 12 further characterized by an insulating operating stick for each of the members to allow application or removal of each of said members with respect to an electric wire independently of the other members.

14. A line engaging device comprising a member, an endwise movable plunger carried by said member, means for constantly urging said plunger in one direction, a clamping jaw coacting with the member, means for movably supporting said jaw upon the member, said plunger normally maintaining said movable jaw in contact with the member, and manually operable means engaging the plunger for forcing the movable jaw toward the member and to maintain the jaw against separating movement.

15. A wire engaging device comprising a tubular member, a plunger carried by the member for endwise movement, a sigmoidal lever pivotally connected intermediate its ends with the member, an end portion of the lever being normally in contact with the plunger, said lever having a jaw for coaction with the tubular member, and yielding means for automatically moving the plunger in one direction to normally maintain the jaw of the lever at its limit of movement toward the member.

16. A device of the class described comprising two relatively movable members between which an electric wire is adapted to pass, means for resiliently maintaining one of said members at the limit of its movement toward the other, an insulating handle providing a support for the device, coacting means carried by the device and the supporting handle to provide additional means for positively urging one of the members toward the other, and interlocking means carried by one of the members and the supporting handle to permit the members and the handle to have unitary turning movement.

17. A grounding set comprising an assembly including a plurality of electric line engaging members, a bus-bar, means carried by the central portion of the bus-bar for directly connecting the bus-bar with one of the line engaging members, a grounding line leading from the member to which the bus-bar is directly engaged and an electrical connection leading from each of the electric line engaging members to the bus-bar certain of said last named connections being to one side of the connection of the grounding line with the bus-bar and the remainder at the opposite side.

18. A grounding set comprising an assembly including a plurality of electric line engaging members, a bus-bar, a grounding line, means for connecting the grounding line to the central portion of the bus-bar, said means including one of the line engaging members to which the bus-bar is directly connected, and electrical connections leading from the remaining line engaging members to the bus-bar at opposite sides of the connection between the bus-bar and the first named line engaging member.

19. A grounding set comprising an assembled unit including a plurality of electric line engaging members, a grounding line leading from one of said members, a bus-bar carried by said member, a conductor leading from each of the remaining members and in electrical connection with the bus-bar, an arm extending from the bus-bar, and means for securing the arm to the member from which the grounding line leads to entirely support the bus-bar by said member.

20. A line engaging device of the class described comprising two relatively movable members between which a line wire is adapted to pass, yieldable means in said device for urging one of said members toward the other, and positive means mounted independently of said resilient means and acting supplemental thereto for urging one of the members toward the other, and a member engaged with said positive means operated from a point remote from the members to make said positive means effective.

21. A line engaging device of the class described comprising relatively movable members between which a line wire is adapted to pass, yieldable means carried by said device for urging one of said members toward the other, positive means mounted independently of said resilient means and acting supplemental thereto for moving one of the members toward the other, a member engaged with said positive means and operated from a point remote from the members to make said positive means effective, one of said members having an elongated portion for sliding contact with the line wire, and a grounding line in connection with one of said members.

22. A line engaging device of the class described comprising two relatively movable members between which a line wire is adapted to pass, yieldable means in said device for urging one of said members toward the other, positive means mounted independently of said resilient means and acting supplemental thereto for urging one of the members toward the other, a member engaged with said positive means and operated from a point remote from the members to make said positive means effective, one of said members having an elongated portion for sliding contact with the line wire, and a grounding line in connection with one of said members, said positive means being effective after the line wire has passed between and inwardly of the elongated portion and the second member.

23. A device of the class described comprising two relatively movable members between which an electrical wire is adapted to pass, resilient means for normally maintaining one of said members at the limit of its movement toward the other, an insulating handle providing a support for the device, and coacting means carried by the device and the supporting handle to provide means for manually urging one of the members toward the other.

24. A device of the class described comprising relatively movable members between which electric wires are adapted to pass, means for resiliently maintaining one of said members at its limit of movement toward the other, an insulating handle to provide a support for the device, and a connection between the handle and the device to provide additional means for moving one of the members relative to the other under direct control of the handle.

25. A grounding set comprising an assembly unit including a wire engaging clamp having two jaws, means for moving one jaw toward the other to clamp the line therebetween, a bus-bar carried by one of the jaws and extending laterally therefrom, additional wire engaging clamps each including two relatively movable jaws to clamp a wire therebetween, a conductor secured to and leading from each of the second named clamps, means for connecting each of said conductors to the bus-bar, and a ground line leading from the clamp carrying the bus-bar.

26. A grounding set comprising an assembly unit including a wire engaging clamp having two jaws, means for moving one jaw toward the other to clamp the line therebetween, a bus-bar carried by one of the jaws and extending laterally therefrom, additional wire engaging clamps each including two relatively movable jaws to clamp a wire therebetween, a conductor secured to and leading from each of the second named clamps, means for connecting each of said conductors to the bus-bar, and a ground line leading from one of the clamps.

HENRY W. BODENDIECK.